United States Patent [19]

Galiyano

[11] Patent Number: 5,261,251
[45] Date of Patent: Nov. 16, 1993

[54] HYDRONIC BUILDING COOLING/HEATING SYSTEM

[75] Inventor: Mark Galiyano, Sinking Spring, Pa.

[73] Assignee: United States Power Corporation, Allentown, Pa.

[21] Appl. No.: 833,955

[22] Filed: Feb. 11, 1992

[51] Int. Cl.$^5$ .............................................. F25B 49/00
[52] U.S. Cl. .................................. 62/176.6; 62/185; 62/238.7
[58] Field of Search .................... 62/176.1, 176.6, 185, 62/260, 238.6, 238.7

[56] References Cited

U.S. PATENT DOCUMENTS

| | | | |
|---|---|---|---|
| 4,058,982 | 11/1977 | Wright | 61/1 R |
| 4,753,285 | 6/1988 | Rawlings | 165/45 |
| 5,025,634 | 6/1991 | Dressler | 62/79 |
| 5,054,541 | 10/1991 | Tripp | 165/45 |
| 5,144,811 | 9/1992 | Brodie et al. | 62/176.6 |

Primary Examiner—John M. Sollecito
Attorney, Agent, or Firm—Eckert, Seamans, Cherin & Mellott

[57] ABSTRACT

A temperature control device cools the air in a space bounded by a thermally conductive structure such as a floor structure having embedded coolant pipes. Liquid coolant is provided at a temperature lower than a temperature of the air space, for example using a heat pump to lower the temperature of a coolant in a circulating path or by circulating the coolant through a ground based heat exchanger. Proportionately controllable valves or variably coupled heat exchangers allow regulation of the temperature of the liquid coolant passed through the embedded coolant pipes. A controller such as a microprocessor has outputs coupled to the valves or variable heat exchangers for regulating temperature, and inputs coupled to sensors providing sufficient data to establish the dew point of the air in the room. The controller repetitively establishes the dew point by sensing, for example, air temperature, pressure and relative humidity. The controller adjusts the temperature of the liquid coolant for maintaining the temperature of the thermally conductive structure below the temperature in the room, but at least slightly above the dew point, thereby cooling the room or at least supplementing the output of a forced air cooling system. In this manner the interior air is cooled via heat extraction from the floor without condensation.

15 Claims, 2 Drawing Sheets

HYDRONIC BUILDING COOLING/HEATING SYSTEM

BACKGROUND OF THE INVENTION

1. Field of the Invention

This invention relates to methods and apparatus for temperature control in premises such as domestic dwellings and the like, using conduit-carried liquid or gaseous coolant for transferring heat energy. More particularly, the invention concerns a flowing coolant system using indoor heat exchangers which are thermally coupled to building structural elements such as tile or stone floors or radiators or finned tubing, wherein sensors and a controller are provided for establishing the dew point of the air in the building and for regulating the liquid coolant to maintain a surface temperature slightly above the dew point so as to prevent condensation on the indoor heat exchange elements.

2. Prior Art

In a building heating system it is necessary to transfer, to the indoor air in the building, heat energy developed by some form of heat collection device. In a building cooling system heat energy is extracted from the indoor air for transfer to a heat sink. A difference in temperature is needed between the heat exchange surfaces and the building air in order to effect thermal transfer. For heating, the heat exchanger is maintained at a higher temperature than the air, and remains dry. For cooling, however, the heat exchange surface is at a lower temperature than the air. Depending on the temperature of the heat exchanger and the dew point of the air, the heat exchanger may accumulate condensation from water vapor in the air.

In modern building systems the source or sink of heat energy is frequently associated with a heat pump. The heat pump employs two heat exchangers coupled in a circulating coolant loop, with a compressor and an expander disposed between the heat exchangers on opposite legs of the circulating loop, whereby heat energy is extracted at a cold side heat exchanger and transferred to a hot side heat exchanger. The indoor heat exchanger is maintained at a different temperature than the indoor air and the outdoor heat exchanger at a different temperature than the outdoor air or other means for providing or sinking heat energy.

Heat pumps can be used for either heating or cooling. The heat pump can be coupled to the building in a switchable manner for selecting whether the indoor heat exchanger will be the hotter or cooler of the two heat exchangers, for heating and cooling respectively. Air conditioning (cooling) apparatus virtually always use a heat pump, and insofar as heating systems use a heat pump, the output typically is supplemented by an additional heat source such as an electrical resistance heater or a furnace for burning natural gas or the like.

Whether heating or cooling, the heat pump system operates substantially in the same manner. However the direction in which the heat pump operates to transfer heat is reversed between the two modes. In either direction the movement of heat energy ca be considered a thermal energy transfer or load. There are a variety of means by which the thermal energy of the heat pump can be transferred to the air in the building; however, it is ultimately necessary to couple the system to one or more heat exchanging surfaces in actual contact with the building air, and to maintain the heat exchanging surface at a different temperature than the air for effecting thermal transfer.

In many installations the building air is passed through an indoor heat exchanger via forced air means. Typically, in the cooling mode, a fan is closely associated with a heat exchanger having a densely packed configuration of thermally conductive pipes with metal fins, through which a cold liquid refrigerant is circulated, exposed to interior air blown over the heat exchanger by the fan. This method is effective for transferring heat energy and the heat exchanger portion of the system is compact. On the other hand, in a forced air system the building must be provided with two sets of air ducts leading from the centralized heat exchanger to the air in the rooms to be heated or cooled, for supply and return of building air. The air ducts required can be quite large, especially for those sections of the supply and return ducts which are closest to the indoor heat exchanger in the typical branching pattern of ducts. The ducts are mounted insofar as possible between studs or other structural members of the building, but they inevitably occupy some of the space in the building which could be applied to occupant use.

One means for avoiding the need for large air ducts is to decentralize the indoor heat exchanger configuration. A liquid coolant circulation system allows circulation and transfer of thermal energy using coolant pipes, which are much smaller than air ducts. This arrangement is characteristic of heating systems using boilers. The liquid coolant, typically water, is heated at a central location and a circulating pump moves the hot water to a plurality of water-to-air heat exchangers located in the rooms to be heated. These heat exchangers are typically mounted along the baseboards of the building slightly above the floor and have a plurality of thermally conductive metal fins coupled to a metal conduit carrying the water or other coolant. Air currents for passing the building air over a typical baseboard heat exchanger are produced by convection rather than by a fan.

It is known in connection with hot water systems to more directly couple a hot water system to a structural element of a building in a so-called hydronic heating system. For example, ceramic tile, stone or concrete floors can be installed over a pattern of pipes for carrying heated water pumped from a boiler or from an intermediate heat exchanger coupled to the boiler, whereby the floor is warmed. The building air is warmed by contact with the floor. The floor surface area in such an installation is large as compared to the area of a typical baseboard heat exchanger, but the thermal transfer characteristics of tile or stone are poor as compared to metal. Additionally, the horizontal position of the floor is not optimal for producing convection currents. Therefore, floor heating via thermal transfer liquid is generally a heat source provided for comfort rather than for providing the basic mechanism whereby the thermal energy of a heating plant is coupled to the building air. Such a hydronic heat system is typically more comfortable than a forced air system because the interior air is not as dry, and the frequent need for a humidifier, with a heated forced air system, is eliminated.

The foregoing discussion of baseboard water circulation and embedded heat exchange pipe patterns relates to heating. It is possible to envision baseboard heat exchangers or an embedded pattern of pipes coupled to a thermal sink, for cooling a space. However, there is a major drawback to such a system. When the temperature of the surface of the floor or the like is lowered to the dew point of the air in the room, condensation accumulates on the heat exchange surfaces. In view of the need to cool a substantial volume of air using the circulating coolant, the coolant is normally provided at a temperature substantially lower than room temperature, almost certainly below the dew point of the air in the room. Condensation is thus a problem, and renders known systems of this type unsuitable for cooling floors and inconvenient for application to baseboard heat exchangers. It is advantageous to have a cool floor on a hot day, as well as cool air, but it is totally unacceptable to have a wet floor under any circumstances. Similarly, it may be possible to use baseboard heat exchangers for cooling, but it is inconvenient and impractical to provide a baseboard cooling system wherein every room includes a means for collecting and disposing of water condensed from the building air. In contrast, a forced air system has a single centralized heat exchanger for cooling, and condensation can be conveniently collected and disposed of centrally, typically by means of a gravity drain or by means of a condensate pump to a drain. Therefore, embedded pipe arrangements and baseboard heat exchangers are preferred only for heating and forced air means are typically provided for cooling, requiring two individual and separate systems to accomplish both heating and cooling.

It would be advantageous to provide a hydronic (water based) arrangement of heat exchangers and embedded pipes which would be useful to cool a space as well as to heat a space. In such an arrangement, the need for air supply and return ducts would be reduced or even eliminated.

Heat pump systems which include a cooling function are often provided with air heat exchangers inside the building and outside the building. It is also known to provide a ground source heat exchanger on the outside of the building, as a sole thermal source/sink or as a supplement to one or more other thermal transfer arrangements such as air heat exchangers. U.S. Pat. Nos. 5,054,541 - Tripp; 5,025,634 - Dressler; 4,753,285 - Rawlings; 4,058,982 - Wright, and others disclose ground source heat pump arrangements wherein certain of the problems with circulation and equilibrium of buried heat transfer loops have been addressed. Commonly owned application Ser. No. 725,962, filed Jul. 5, 1991, discloses a particularly convenient and efficient method and apparatus for installing a ground heat exchanger in a backhoe trench, at a relatively shallow position in the ground, for taking advantage of the stable underground temperature and heat supply or sink characteristics of the earth. These disclosures are hereby incorporated for their teachings of ground based heat exchange systems and ground mounted heat exchangers. However, as aforesaid, conventional air to air heat pump systems can also be utilized for operation of the subject invention, and are included within the scope of the subject invention.

SUMMARY OF THE INVENTION

According to the invention a hydronic cooling system, which is operable in a reverse mode as a hydronic heating system, is provided with a means for sensing the dew point of the indoor air and controlling the temperature of the coolant circulated in the system so as to provide as low a surface temperature on the floor or other indoor heat exchange surface as is possible without condensation. The invention thus provides a means for at least supplementing a building cooling system without the drawback of a wet floor or the like.

While a conventional air to air heat exchanger system can be utilized with this invention, the hydronic system is efficient and particularly convenient where the substantial thermal capacity of a ground source heat exchanger supplies the outdoor heat sink. It is an aspect of a ground based heat exchange system that the temperature of water or other coolant exiting the heat exchanger is relatively stable notwithstanding seasonal air temperature variations, and remains on the order of 55° F. through the year. It is possible according to the invention to shift the temperature of the coolant using a heat pump or to provide a serial arrangement of coupled heat pumps. However, for cooling via the embedded pipe hydronic cooling arrangement, it is also convenient to use the exiting coolant directly, or to provide a proportionate valve arrangement whereby the coolant is circulated in the embedded pipes at the temperature which is needed.

In order to take optimal advantage of the ground source heat exchanger for purposes of cooling, sensing means for atmospheric variables defining the dew point of the indoor air are coupled to a controller which determines the dew point of the air in the building. The temperature of the heat exchange surfaces in the building are also monitored. Via a closed loop control arrangement the controller varies the temperature and/or flow rate of the liquid coolant so as to keep the indoor heat exchange surfaces at a temperature slightly higher than the dew point. The flow of coolant, and thus the temperature of the indoor heat exchange surfaces, can be varied using a proportional valve arrangement wherein colder coolant from the ground source heat exchanger is added to the relatively warmer coolant already circulating in the heat exchanger. In many situations a portion of the coolant exiting the ground source heat exchanger and passing through the basic cooling system of the building can be passed through a baseboard or floor mounted circulation system, whereby cooling is provided or the basic cooling system is supplemented, thus reducing the need for a high capacity forced air system and the attendant costs of power and ducting.

These and other aspects are obtained according to the invention in a temperature control device for cooling the air in a space bounded by a thermally conductive structure such as a floor structure having embedded coolant pipes. Liquid coolant is provided at a temperature lower than a temperature of the air space, for example using a heat pump to lower the temperature of a coolant in a circulating path or by circulating the coolant through a ground based heat exchanger. Proportionately controllable valves or variably coupled heat exchangers allow regulation of the temperature of the liquid coolant passed through the embedded coolant pipes. A controller such as a microprocessor has outputs coupled to the valves or variable heat exchangers for regulating temperature, and inputs coupled to sensors providing sufficient data to establish the dew point of the air in the room. The controller repetitively establishes the dew point by sensing, for example, air temperature, pressure and relative humidity. The controller adjusts the temperature of the liquid coolant for maintaining the temperature of the thermally conductive structure below the temperature in the room, but at least slightly above the dew point, thereby cooling the room or at least supplementing the output of a forced air cooling system. In this manner the floor is cooled without condensation.

The liquid coolant to be passed through the embedded pipes can be the same coolant passed through an underground heat exchanger in a forced air heat pump cooling system, which typically provides a return temperature sufficiently low for cooling. The cold side heat exchanger of a heat pump system (which is substantially colder than the coolant return from an in ground heat exchanger) can also be thermally coupled to the coolant flowing in the embedded pipes, using an intermediate heat exchange loop, or a system of proportionate valves.

BRIEF DESCRIPTION OF THE DRAWINGS

There are shown in the drawings exemplary embodiments of the invention as presently preferred. It should be understood that the invention is not limited to the precise arrangements and instrumentalities shown and discussed, and is capable of variation in accordance with the scope of the appended claims and their reasonable equivalents. In the drawings.

DETAILED DESCRIPTION OF THE PREFERRED EMBODIMENTS

Figure 1:
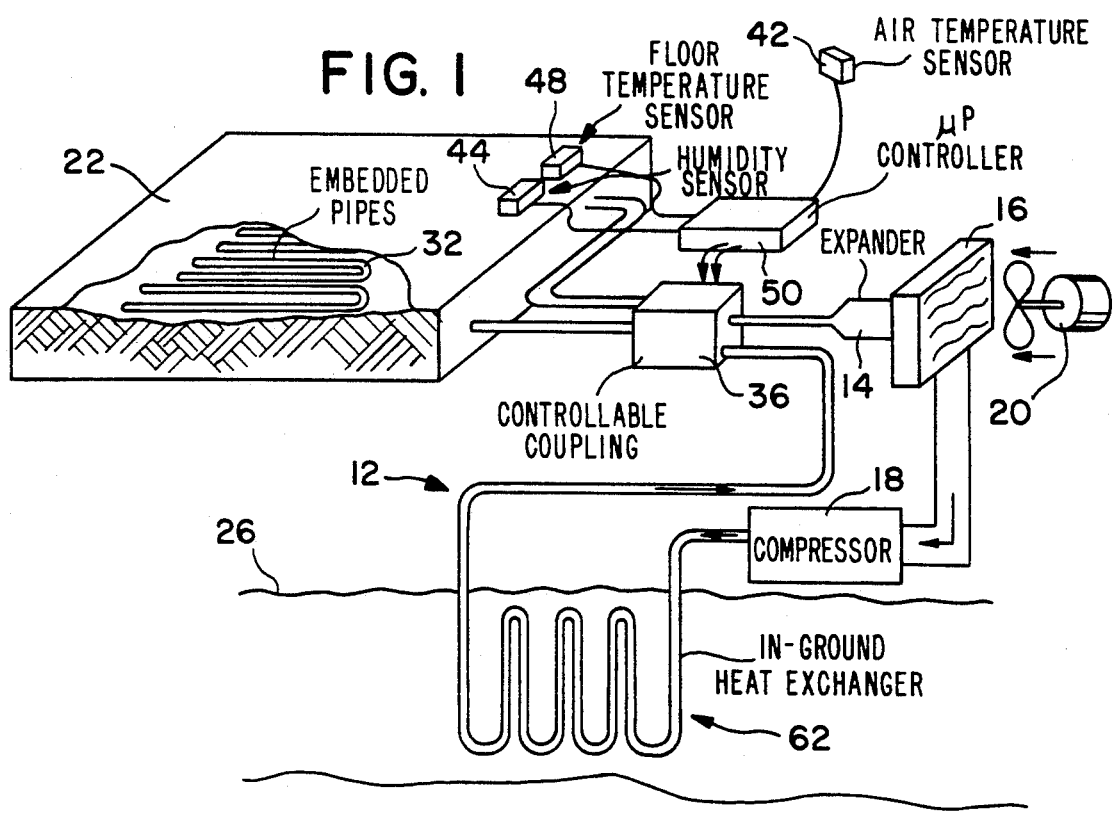
FIG. 1 is a schematic diagram of a temperature control system according to the invention, having controllable means directing a flow of coolant from an in ground heat exchanger through a system of pipes embedded in a building structure.

Referring to FIG. 1, a temperature control apparatus is provided for cooling the air in an air space bounded at least partly by a thermally conductive structure such as a floor 22. The floor 22 can be, for example, a ceramic tile or stone floor, laid over a network of pipes 32, which are to carry coolant at a temperature which is regulated to achieve or assist in cooling the air space while avoiding condensation by remaining slightly above the dew point of the air in the air space. The structure encasing the embedded pipes 32 can be, for example, concrete on which a floor surface covering is laid. Although such a structure is not highly thermally conductive, it is sufficiently thermally conductive that the temperature of the surface of floor 22 reflects the temperature of the liquid circulated in pipes 32.

Basically, the system requires a source of liquid coolant at a temperature lower than a temperature of the air space, the source indicated generally as 12, and controllable thermal coupling means 36 disposed between the source 12 and the embedded pipes 32 in the structure 22. The controllable thermal coupling is adjusted to keep the temperature at the surface of floor 22 at least slightly above the dew point of the indoor air. Accordingly, parameters defining the dew point must be sensed and used to vary the input to the controllable thermal coupling in a closed loop control.

Sensors 42, 44 are provided for producing signals as a function of at least the temperature and relative humidity of the indoor air, and sensor 48 produces a signal as a function of the temperature on the surface of the floor or other thermally conductive structure 22. The temperature and relative humidity of the air substantially define the dew point, that is, the highest temperature of a surface upon which water from the air will condense. The invention thermally couples between the source 12 of liquid coolant and the embedded pipes 32 in the floor or other structure in a variable controlled manner, so as to maintain the surface of the floor at a temperature below the indoor air temperature (as needed for thermal transfer). However, the dew point is the lower limit of control. If cooling requirements dictate a surface temperature below the dew point, the controller reduces the floor surface temperature to just above the dew point only. This arrangement does not employ the full cooling capacity possible from the source 12, but also keeps the floor or the like dry. As a result it is not necessary to provide for collection and disposal of condensed water vapor.

The controller 50 can also be coupled to a dehumidifier (not shown) and arranged to activate the dehumidifier if cooling demand is such that the surface temperature of the floor 22 is approaching the dew point. Alternatively, the cooling system can bottom out at the dew point and simply not supply the cooling demand where condensation would result. As another alternative, several large and centrally located supply and return air ducts can be provided for use with a conventional air to air cooling system, utilizing a condensate drain, during such conditions.

The dew point also varies with barometric pressure, which can be measured and provided as an input to controller 50 as well. Preferably the controller 50 comprises a programmed microprocessor and can be arranged to either calculate the dew point from the variables or to read the dew point from a stored look-up table indexed to temperature, humidity and/or barometric pressure. If barometric pressure is not measured, the dew point can be assumed for the highest expected barometric pressure (e.g., 1050 mm or 31 inches Hg). Whereas the dew point will be lower at lower barometric pressures, condensation is prevented, albeit with a potential for decreasing the cooling capacity of the hydronic system.

The sensors 42 for indoor air temperature, and 44 for indoor humidity, are coupled to a controller 50 as inputs. The output of controller 50 is in turn coupled to controllable thermal coupling means 36, which is arranged to vary the temperature of coolant liquid flowing in the embedded pipes 32. This variation in temperature is transferred to the surface of the floor 22, where the temperature is sensed, enabling the controller to operate in a closed loop control. There are a number of variations for specific controllable thermal couplings of the thermal transfer loops, several of which are discussed in detail hereinafter.

Figure 2:
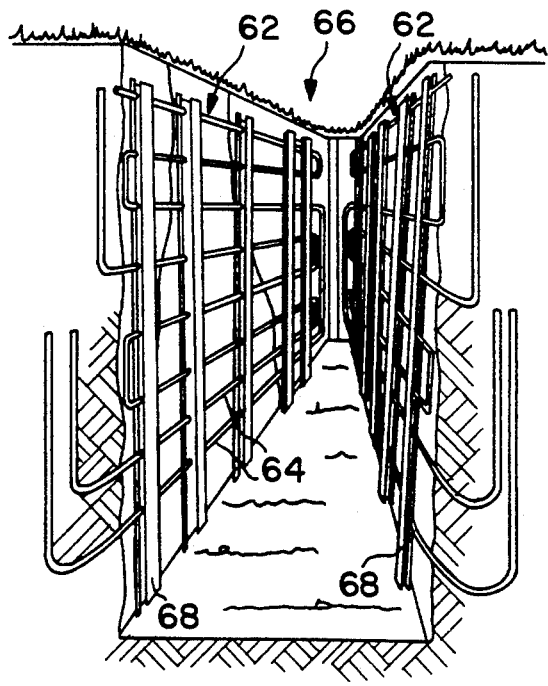
FIG. 2 is a perspective illustration of an in ground heat exchanger as used according to a preferred embodiment of the invention.

Referring to FIG. 2, the source 12 of a coolant at a temperature lower than the indoor air temperature can comprise a heat pump coupled to a ground source heat exchanger 62. This heat exchanger 62 preferably comprises a series of thermally conductive coils 64, mounted below the surface 26 of the ground, in a pattern along the walls of a trench 66. The heat exchanger 62 can include one or several coil passes. As shown, the coils are preferably arranged in planar configuration on spacer posts 68, which hold the array of coils upright along the trench walls. The trench is conveniently formed with a backhoe and the coils can be placed without entering the trench and risking a cave-in, using the spacer posts. Preferably the coils 64 are buried such that the highest pass is below the frost line, to avoid displacement due to frost heaving, as well as to place the coils at a depth where the temperature is substantially constant notwithstanding seasonal temperature variations at the surface 26. After the coils are placed the trench is refilled with earth, whereby the coils are thermally coupled to the earth and maintain a relatively stable temperature on the order of 55° F.

Figure 3:
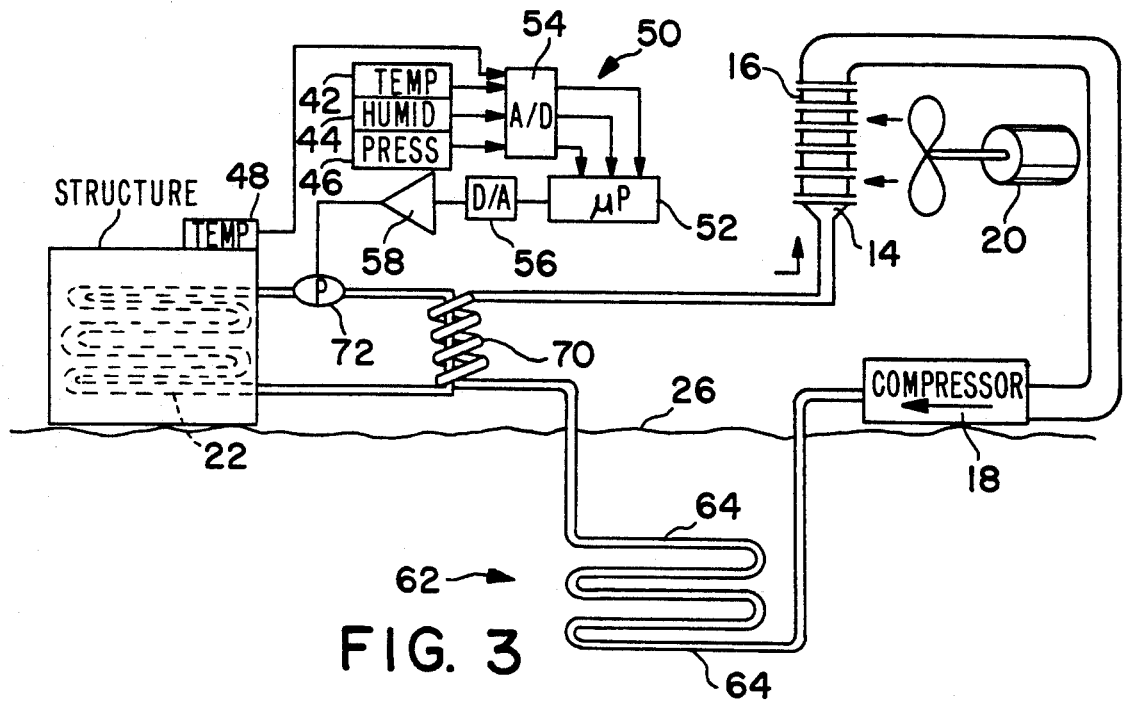
FIG. 3 is a schematic diagram illustrating an alternative embodiment having an intermediate heat exchanger.

In the embodiments according to FIGS. 1 and 3 the hydronic system which, of course, can typically supply all necessary interior heat absent forced air supplement, is coupled to a heat pump which also supplies forced air via fan 20. The configuration shown is arranged for heating; however the heat pump can be provided with suitable switching features for operation in either a heating or cooling mode, as known in the art. The heat pump comprises an indoor heat exchanger 16, for example a fan driven forced air unit, the outdoor ground based heat exchanger 62, an expander 14 and a compressor 18. For cooling the expander 14 leads into the indoor heat exchanger 16 and the compressor 18 leads into the outdoor heat exchanger 62. For heating this arrangement is reversed. Of course in the heating mode the controller 50 need not limit the extent to which the floor 22 is warmed because the circulating coolant is supplied at a higher temperature than that of the indoor air. In an embodiment using forced air, it is still necessary to provide air ducts for supply and return. However the hydronic system meets a portion of the load, and accordingly the forced air system can be of a relatively smaller capacity, including having smaller ducts and/or only a few central ducts, than a system of similar capacity which is based wholly on forced air.

Figure 4:
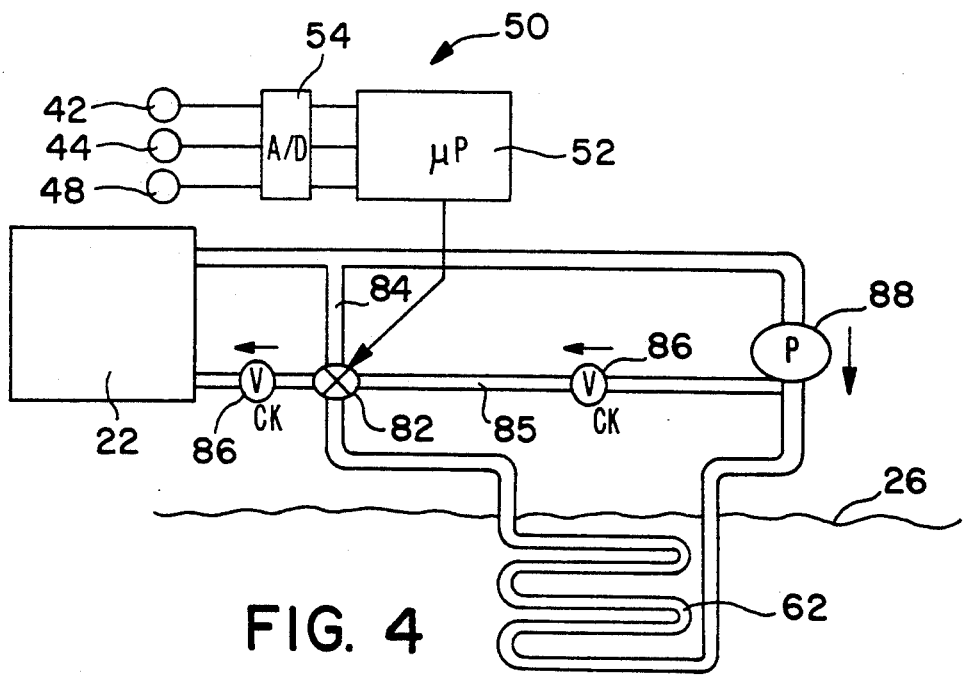
FIG. 4 is a schematic diagram illustrating an alternative embodiment wherein the embedded pipe loop is coupled to a heat exchange circulating loop downstream of the cold side heat exchanger.

FIGS. 3 and 4 illustrate exemplary arrangements for controllable thermal coupling between the embedded pipes 32 and the source 12. This coupling can involve a variable heat exchange relationship between separate coolant circulating paths for the embedded pipes and the ground source heat exchanger, or alternatively the embedded pipes and the ground source circuit can be coupled so that a portion of the coolant passing through the ground source heat exchanger also passes through the embedded pipes.

In FIG. 3, the hydronic circulation loop is separate from the coolant loop of a forced air heat pump system including a ground based heat exchanger. An intermediate or coupling heat exchanger 70 is disposed in both of the loops for liquid to liquid thermal transfer. A hydronic circulation pump 72 is coupled to the hydronic loop for varying the flow rate of the hydronic liquid through embedded pipes 32. The circulation pump is operated intermittently or at a variable flow rate from driver or power controller 58, which has its input coupled to the output of controller 50. Controller 50 comprises microprocessor 52 for effecting logical and mathematical functions. The microprocessor is coupled to the respective indoor air and floor surface temperature sensors 42 through 48 via analog to digital converter 54. The sensors can produce analog voltage or current levels which vary with the parameter measured, these levels being coupled to controller 50 through the analog to digital converter 54. Separate A/D converters can be provided for each input, or one A/D converter can be multiplexed to successively translate the respective levels into numeric data.

In the embodiment shown in FIG. 3 the output of the microprocessor is numerical, and accordingly a digital to analog converter 56 is coupled to the microprocessor output to provide an analog level to driver 58. Driver 58 and pump 72 produce a variable flow rate in the hydronic loop as a function of the microprocessor numeric output. In an embodiment wherein the pump 72 is operated intermittently, the output of the microprocessor can be a single line digital signal for switching the pump on or off.

In intermittent operation of pump 72, a sudden influx of relatively cold liquid is provided to the embedded pipes 32 whenever the pump is operated. Whereas the floor 22 has a substantial thermal inertia, the surface of the floor remains at close to an average temperature defined by the coolant and the ambient conditions. The frequency of intermittent operation is adjusted by the microprocessor to obtain the required amount of thermal coupling between the thermal source and the floor 22.

If the temperature difference between the hydronic coolant liquid and the floor is large and the pump 72 is operated over a range of flow rates, there is a tendency of the floor area near the input coupling to the hydronic loop to become cooler than the floor area near the outlet coupling. Preferably the route of the embedded pipes 32 is arranged to evenly distribute the thermal coupling across the area of the floor. Where the pump 72 is operated intermittently, in each case for a sufficient interval to substantially flush the hydronic liquid through one or more exchanges, the liquid throughout the embedded pipes will be brought to substantially equal temperature and the route of the pipes 32 is less important.

Whereas the ground source heat exchanger provides liquid coolant to a heat pump configuration in FIGS. 1 and 3, the coupling between the heat pump loop and the hydronic loop can be made either at the outlet from the ground source heat exchanger or at the cold side liquid to air heat exchanger 16. The circulating coolant, which exits the ground source heat exchanger at about 55° F., is at a low enough temperature at either point in the circulation path to effectively cool floor 22. Furthermore, the invention can be applied to an arrangement which does not include a heat pump. In FIG. 4, ground source heat exchanger 62 is coupled in a circulation loop including circulating pump 88 for moving the coolant around the path, and a proportionate valve 82 is provided for adjusting under control of microprocessor 50 the proportion of the liquid coolant which is passed through the embedded pipes 32 in floor 22, or caused to bypass the embedded pipes via hydronic bypass leg 84. Similarly, for recirculating the liquid without cooling the liquid in the ground source heat exchanger 62, a second bypass leg 85 can be provided for circulating the coolant around the ground source heat exchanger.

Additional arrangements for thermally coupling a source of coolant liquid at a temperature below the indoor air temperature, to the hydronic pipes embedded in the building structure, are also possible. Similarly, the advantages of the invention can be achieved when applied to other forms of indoor heat exchangers where cooling and/or condensation is a problem. For example, where the building includes baseboard heat exchangers, for example those used during cold weather in a water circulation heating system, these same baseboard heat exchangers can be coupled to the system of the invention to assist in cooling the structure during warm weather. Whereas the invention limits the minimum temperature of the indoor heat exchangers to prevent condensation, cooling is assisted without producing condensation in the baseboard heat exchangers and the building can be cooled where an air-conditioning system was heretofore non-existent, or with a smaller capacity air conditioning system than would otherwise be required.

The invention having been discussed in connection with preferred exemplary embodiments, additional variations on the preferred embodiments will now become apparent to persons skilled in the art. Whereas the invention is intended to encompass the disclosed embodiments and a range of variations in accordance herewith, reference should be made to the appended claims and their reasonable equivalents in order to assess the scope of the invention in which exclusive rights are claimed.

I claim:

1. A temperature control apparatus for air in an air space, comprising:
    a thermally conductive structure comprising a building floor;
    a source of liquid coolant at a temperature lower than a temperature of the air space;
    controllable means for applying a temperature variable liquid coolant to the thermally conductive structure;
    means for sensing at least the temperature of the air, a relative humidity of the air space, and a temperature of the thermally conductive structure;
    a controller coupled to said means for sensing and to said controllable means, the controller being operable to determine a dew point of the air space and to adjust the variable flow of liquid coolant for maintaining the temperature of the thermally conductive structure at least slightly above the dew point.

2. The temperature control apparatus according to claim 1, wherein said means for sensing is operable to sense barometric pressure, temperature and relative humidity of said air.

3. The temperature control apparatus according to claim 1, wherein the controller is a programmed processor and further comprising analog to digital conversion means coupled between the means for sensing and the controller.

4. The temperature control apparatus according to claim 1, wherein the controllable means for applying a temperature variable liquid coolant to the thermally conductive structure is operative to adjust a temperature of the liquid coolant supplied to the thermally conductive structure.

5. A temperature control apparatus for air in an air space bounded at least partly by a thermally conductive structure, comprising:
    a source of liquid coolant at a temperature lower than a temperature of the air space;
    controllable means for applying a temperature variable liquid coolant to the thermally conductive structure, operative to adjust a temperature of the liquid coolant supplied to the thermally conductive structure;
    means for sensing at least the temperature of the air, a relative humidity of the air space, and a temperature of the thermally conductive structure;
    a controller coupled to said means for sensing and to said controllable means, the controller being operable to determine a dew point of the air space and to adjust the variable flow of liquid coolant for maintaining the temperature of the thermally conductive structure at least slightly above the dew point; and,
    a forced air cooling apparatus operative to supply cool air to the air space, whereby cooling of the thermally conductive structure supplements cooling via the forced air cooling apparatus.

6. The temperature control apparatus according to claim 5, wherein the source of liquid coolant is a circulating coolant supply for the forced air cooling apparatus, and wherein the controllable means for applying the temperature variable liquid coolant is operable to adjust the temperature of a portion of the circulating coolant coupled to the thermally conductive structure.

7. The temperature control apparatus according to claim 5, further comprising a ground based heat exchanger operable to cool the liquid coolant supplied to the controllable means and to the forced air cooling means.

8. The temperature control apparatus according to claim 7, wherein the ground based heat exchanger is coupled in a heat pump coolant circulation loop comprising a compressor and an expander.

9. The temperature control apparatus according to claim 8, wherein the heat pump coolant circulation loop is directly coupled to the controllable means for applying the temperature variable liquid coolant to the thermally conductive structure.

10. The temperature control apparatus according to claim 9, wherein the heat pump coolant circulation loop is coupled to the controllable means for applying the temperature variable liquid coolant via at least one heat exchanger disposed to transfer heat energy between the temperature variable liquid and the heat pump coolant circulation loop.

11. The temperature control apparatus according to claim 9, wherein the thermally conductive structure is a floor having embedded pipes carrying the temperature variable liquid coolant.

12. The temperature control apparatus according to claim 11, which operates in a reverse direction to supply heat to interior air.

13. The temperature control apparatus according to claim 12, which utilizes a ground source heat supply/heat sink.

14. The temperature control apparatus according to claim 12, which utilizes a water source heat supply/heat sink.

15. The temperature control apparatus according to claim 12, which utilizes an exterior air heat supply/heat sink.

* * * * *